United States Patent [19]

Bjornard et al.

[11] Patent Number: 5,450,238

[45] Date of Patent: Sep. 12, 1995

[54] FOUR-LAYER ANTIREFLECTION COATING FOR DEPOSITION IN IN-LIKE DC SPUTTERING APPARATUS

[75] Inventors: Erik J. Bjornard, Northfield; Debra M. Steffenhagen, Faribault, both of Minn.; Eric R. Dickey, Beaverton, Oreg.

[73] Assignee: Viratec Thin Films, Inc., Faribault, Minn.

[21] Appl. No.: 165,438

[22] Filed: Dec. 10, 1993

[51] Int. Cl.⁶ .............................................. G02B 5/28
[52] U.S. Cl. ............................. 359/580; 359/586; 359/588
[58] Field of Search ................. 359/580, 582, 586, 588

[56] References Cited

U.S. PATENT DOCUMENTS

| | | | |
|---|---|---|---|
| 2,478,385 | 8/1949 | Gaiser | 359/586 |
| 3,185,020 | 5/1965 | Thelen | 359/586 |
| 3,432,225 | 3/1969 | Rock . | |
| 3,565,509 | 2/1971 | Sulzbach . | |
| 3,781,090 | 12/1973 | Sumita | 359/588 |
| 3,804,491 | 4/1974 | Morokuma et al. | 359/586 |
| 3,829,197 | 8/1974 | Thelen | 359/588 |
| 3,858,965 | 1/1975 | Sumita | 359/588 |
| 4,264,133 | 4/1981 | Sakurai | 359/586 |
| 4,387,960 | 6/1983 | Tani | 359/588 |
| 5,105,310 | 4/1992 | Dickey . | |
| 5,170,291 | 12/1992 | Szczyrbowski et al. | 359/588 |
| 5,270,858 | 12/1993 | Dickey | 359/586 |

FOREIGN PATENT DOCUMENTS 0263541 4/1988 European Pat. Off. .
9204185 3/1992 WIPO .

OTHER PUBLICATIONS

Lockhart et al., "Three Layered Reflection Reducing Coatings," *J. Opt. Soc. Am.*, 37, 9, pp. 689–694, (1947).
L. I. Epstein, "The Design of Optical Fibers," *J. Opto. Soc. Am.*, 42, pp. 806–810, (1952).

*Primary Examiner*—Martin Lerner
*Attorney, Agent, or Firm*—Fish & Richardson

[57] ABSTRACT

An antireflection coating for a substrate including four layers and having optimized photopic reflectance and optimized for deposition by sputtering. The first layer (the layer farthest from the substrate) has a refractive index less than the refractive index of the substrate and a thickness of about one-quarter wavelength. The second layer (the layer adjacent the first layer) has an refractive index greater than about 2.2 and a thickness of about a half wavelength. The third layer has refractive index less than that of the second layer. The fourth layer (the layer adjacent the substrate) has a refractive index less than about 2.0 and greater than that of the third layer. The combined thickness of the third and fourth layers is less than about a quarter wavelength. The first and third layers may include silicon dioxide. The second layer may include titanium dioxide or niobium oxide. The fourth layer may include indium oxide, tin oxide, indium tin oxide, or zinc oxide.

9 Claims, 4 Drawing Sheets

FOUR-LAYER ANTIREFLECTION COATING FOR DEPOSITION IN IN-LIKE DC SPUTTERING APPARATUS

BACKGROUND OF THE INVENTION

The present invention is directed in general to thin film multilayer antireflection coatings. It is directed in particular to a four-layer antireflection coating deposited in an in-line sputter coating apparatus by DC reactive sputtering.

In-line sputter coating apparatuses generally comprise a vacuum chamber including one or more sputtering cathodes. Two or more chambers arranged in-line may be connected together, for example to increase space available for sputtering cathodes. The sputtering cathodes may be planar magnetron cathodes, rotating cylindrical magnetron cathodes or a combination thereof. Each cathode includes a sputtering target of the material to be sputtered. A titanium target material, for example, may be reactively sputtered in an oxygen atmosphere to deposit a titanium dioxide ($TiO_2$) layer. Cathodes having different target materials may be included in the apparatus for depositing coatings including layers of different materials. Such coatings are generally referred to as multilayer coatings.

A multilayer coating is deposited in an in-line system by introducing a substrate to be coated into the apparatus through a vacuum lock in one end of the chamber. The substrate is then transported past the cathodes, in turn, to deposit the coating, and then removed from a vacuum lock at the opposite end of the apparatus. The time required to coat a substrate by in-line sputtering is essentially only the time required to deposit the coating layer or layers. For an apparatus having a given number of cathodes, the speed with which a substrate may be coated and the cost of the coating is determined in large part by the rate at which material is sputtered from the cathode and deposited on the substrate.

In-line sputtering apparatus may be used to deposit high quality optical coatings such as antireflection coatings. Such coatings have formerly been deposited by thermal evaporation of coating materials in a vacuum. An apparatus used to deposit coatings by thermal evaporation is primarily a batch coating apparatus having only a single coating chamber. In batch coating, the substrates to be coated are loaded into a coating chamber, the chamber is evacuated, the substrates are coated, the chamber is vented, and the coated substrates are removed. Often substrates must also be heated in the vacuum chamber before they are coated, and coated substrates must be cooled before the chamber is vented for unloading the substrates. A coating cycle time, from loading to unloading substrates, may be two or more hours. Depositing the layers of the coating, however, may require only a few minutes.

The prior art teaching on coating designs, particularly multilayer antireflection coating designs, does not consider deposition speed in selecting coating materials. Materials are most often selected on the basis of advantageous optical or mechanical properties. For this reason conventional antireflection coating designs developed for thermal evaporation are not ideally suited for DC reactive sputter deposition.

Accordingly, it is an object of the present invention to provide an antireflection coating design optimized for deposition by DC reactive sputtering.

It is a further object of the present invention to provide an antireflection coating suitable for deposition in in-line sputtering apparatus.

SUMMARY OF THE INVENTION

The present invention is directed to an antireflection coating for a substrate.

The coating includes four layers designated the first, second, third, and fourth in consecutive numerical order beginning with the layer farthest from the substrate. The first layer has a refractive index less than the refractive index of the substrate and an optical thickness of about one-quarter wavelength at a wavelength between about 480 and 560 nanometers (nm). The second layer has a refractive index greater than about 2.2 and an optical thickness of about one-half wavelength at a wavelength between about 480 and 560 nanometers. The third layer has a refractive index less than the refractive index of the second layer. The fourth layer has a refractive index greater than the refractive index of the third layer but less than about 2.0. The combined optical thickness of the third and fourth layers is less than about one quarter wavelength at a wavelength between about 480 and 560 nanometers.

The second layer may include titanium dioxide or niobium oxide. The first and third layers may include silicon dioxide. The fourth layer may include a material selected from the group consisting of indium oxide, tin oxide, indium tin oxide, and zinc oxide.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
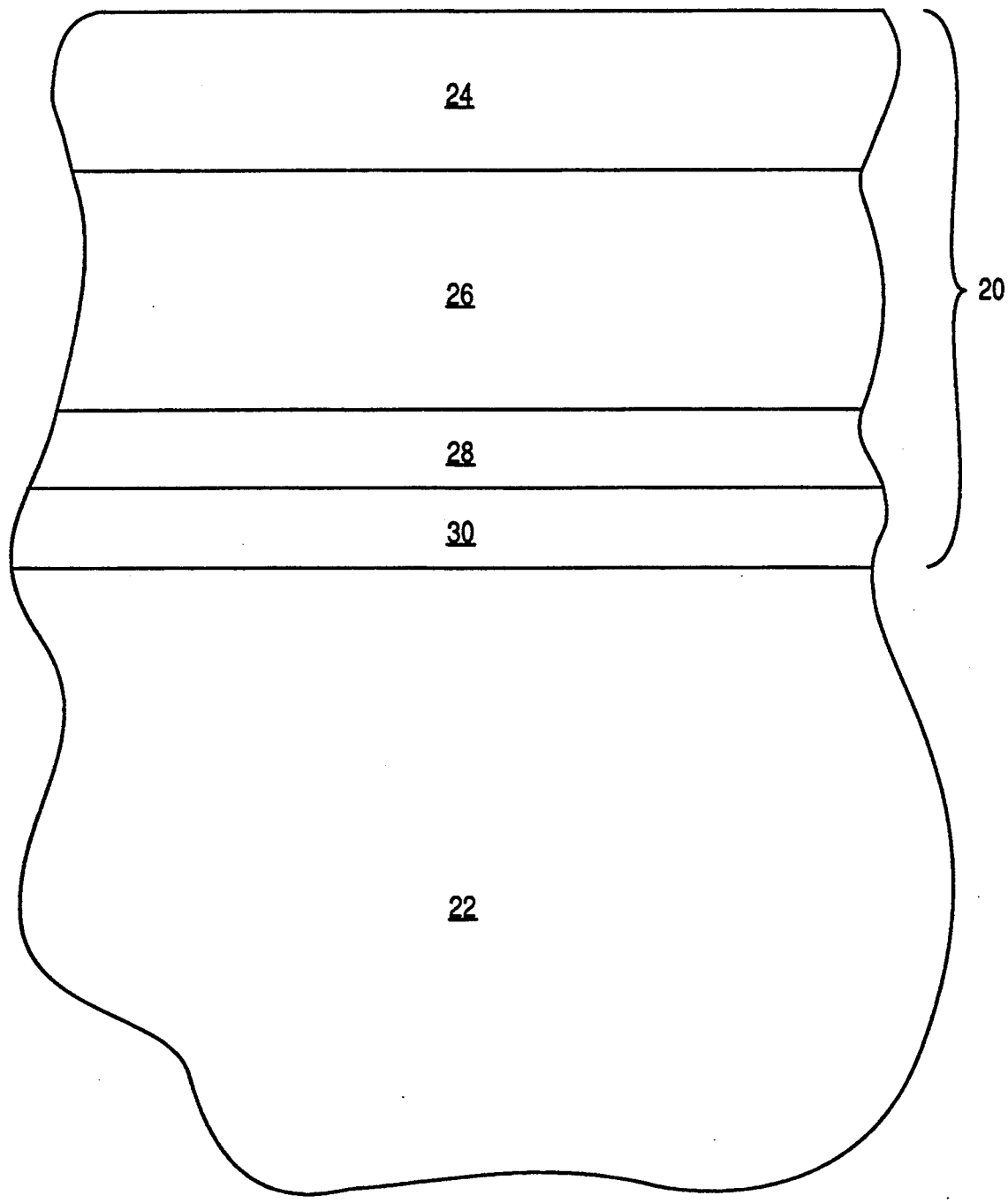
FIG. 1 schematically illustrates an arrangement of layers in a four-layer antireflection coating.

The present invention is directed to a four-layer antireflection coating. The four-layer antireflection coating is based on four-layer coatings described by Rock in U.S. Pat. No. 3,432,225 and Sulzbach in U.S. Pat. No. 3,565,509. The four-layer coatings of Rock and Sulzbach are derived from a three layer coating described in a paper "Three Layered Reflection Reducing Coatings", Lockhart and King, *J. Opt. Soc. Am.*, 37, 9, 689–694, (1947).

The three-layer coating of Lockhart and King includes a first layer, located farthest from the substrate, having a refractive index of about 1.47 and an optical thickness of about one quarter wavelength of visible light. A second layer, located adjacent the first layer has a refractive index of between about 1.8 and 2.4 and an optical thickness of about one-half wavelength of visible light. A third layer, located adjacent the substrate, has a refractive index between the refractive index of the second layer and the refractive index of the substrate and an optical thickness of about one-quarter wavelength of visible light.

A disadvantage of the Lockhart and King coating is that, for optimum optical performance, each layer of the system must have a specific value of refractive index, and the layers must have the optical thickness relationship 1:2:1 (first layer: second layer: third layer). As such, if any layer does not have the optimum index value, the defect can not be effectively rectified by altering the thickness relationship of the layers. The Lockhart and King design is thus limited in performance by the availability of materials having the desired index materials.

Both Rock and Sulzbach describe a four-layer coating structure wherein the third layer of the Lockhart and King coating is replaced by two layers. One of the two layers (the third layer) has a relatively low refractive index, and the other layer (the fourth layer) has a relatively high refractive index. The optical thickness ratio of all of the layers in the structure may be varied to accommodate a range of different values of refractive index for the layers. The index values for the first and second layers are generally similar to the values taught by Lockhart and King.

Rock describes the second and fourth layers as having a high refractive index and teaches that a high refractive index is greater than about 2.0. Furthermore, Rock teaches that a preferred material for the second and fourth layers is zirconium oxide ($ZrO_2$) having a refractive index of about 2.06. Sulzbach teaches the use of zirconium oxide or cerium dioxide for the fourth layer. Cerium dioxide has a refractive index of about 2.35. Zirconium oxide and cerium dioxide have the drawback that their sputtering rates are relatively slow.

In a paper "The Design of Optical Filters", L. I. Epstein, *J. Opt. Soc. Am.*, 42, pp 806–810, (1952), a five-layer antireflection coating is disclosed. The Epstein coating includes first, third, and fifth layers of magnesium fluoride ($MgF_2$) having a refractive index of about 1.38, and second and fourth layers of zinc sulphide (ZnS) having a refractive index of about 2.3. Zinc sulphide and magnesium fluoride can not be easily deposited by sputtering.

In coatings deposited by DC reactive sputtering titanium dioxide is commonly used as a high refractive index layer. Titanium dioxide may be DC reactively sputtered using a titanium target in an atmosphere including oxygen. The refractive index of a DC reactively sputtered film of titanium dioxide is generally about 2.35 at a wavelength of about 520 nanometers. As such, titanium dioxide has about the same refractive index as cerium dioxide and zinc sulphide.

Silicon dioxide ($SiO_2$), deposited by sputtering a silicon target in an atmosphere including oxygen, may be used as a low refractive index layer, in place of a magnesium fluoride layer in prior art coatings. A DC reactively sputtered silicon dioxide layer has a refractive index of about 1.46 at a wavelength of about 520 nanometers.

Turning now to the drawings, FIG. 1 shows a four-layer antireflection coating structure 20 deposited on a substrate 22. The thickness of the layers depicted in FIG. 1 corresponds generally to about their optical thickness. The optical thickness of layers may be specified as some fraction of a wavelength generally in the center of the visible spectrum. This wavelength may vary according to the range or band of wavelengths over which the coating is desired to be effective. Generally, the wavelength will be between 480 and 560 nanometers. A first layer 24 has an optical thickness of about one-quarter wavelength. Generally, it is preferred that the first layer 24 has a refractive index less than the refractive index of substrate 22. A second layer 26 has a high refractive index, for example greater than about 2.2, and an optical thickness of about one-half wavelength. A third layer 28 and a fourth layer 30 have a combined thickness less than about one-quarter wavelength.

Third layer 28 has a refractive index less than second layer 26, and fourth layer 30 has a refractive index greater than that of the third layer 28. As discussed above, in prior art coatings having four or five layers, it is taught that fourth layer 30 has a refractive index greater than 2.0. In the present invention fourth layer 30 has a refractive index less than 2.0 at a wavelength of about 520 nanometers, for reasons which are set forth in detail below.

Figure 2:
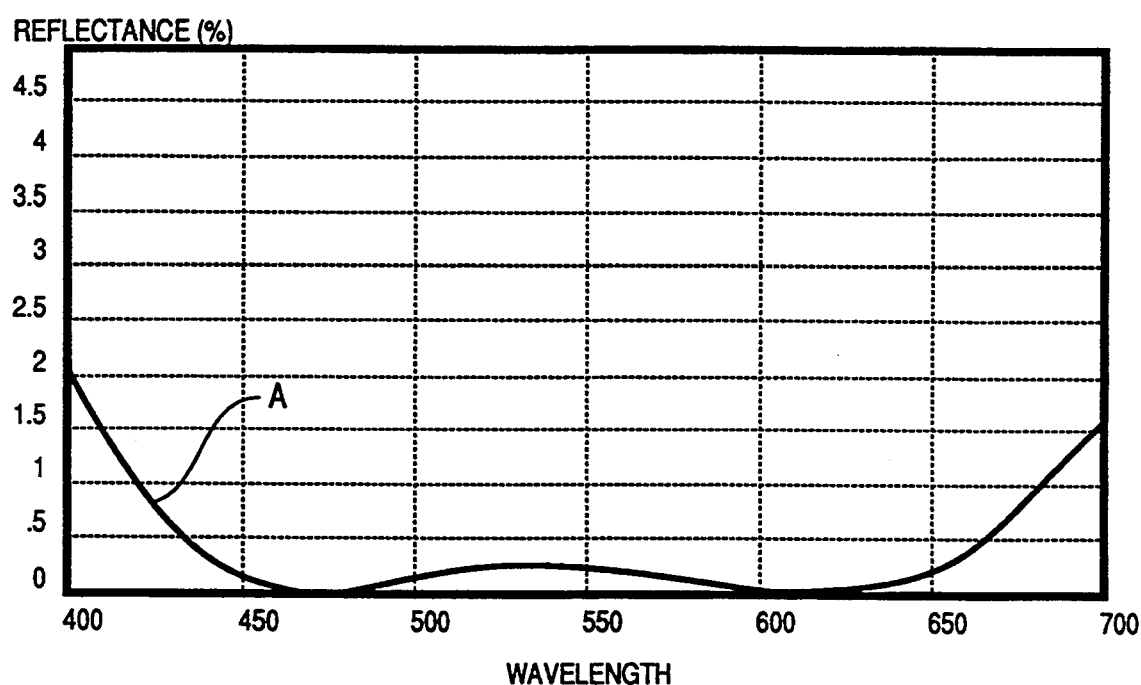
FIG. 2 graphically illustrates the reflection as a function of wavelength for one surface of a substrate coated with a four-layer antireflection coating according the prior art.

Referring now to FIG. 2, curve A shows the computed reflection as a function of wavelength for coating 20 wherein first and third layers 24 and 28 are silicon dioxide layers, and second and fourth layers 26 and 30 are titanium dioxide layers, respectively. The coating generally follows the teaching of the prior art in that the fourth layer, i.e., the layer adjacent substrate 22, has a refractive index greater than 2.0. The thickness of layers is shown in Table 1. The layer thicknesses were computer optimized to provide the lowest possible reflection in the wavelength range between about 425 and 675 nanometers. In Table 1, layer thickness are shown in terms of both a physical thickness, and an optical thickness at a wavelength of 500 nanometers, i.e., at a wavelength between about 480 and 560 nanometers. The coating of Table 1 has a photopic reflection of about 0.25 percent.

TABLE 1

| Layer | Physical | | Optical |
| | Material | Thickness (nm) | Thickness @ $\lambda$ = 500 nm |
| --- | --- | --- | --- |
| 1 | $SiO_2$ | 84.9 | .248 |
| 2 | $TiO_2$ | 105.0 | .494 |
| 3 | $SiO_2$ | 24.9 | .073 |
| 4 | $TiO_2$ | 11.7 | .055 |

While titanium dioxide is commonly used as a high refractive index material in DC reactively sputtered coatings, its sputtering rate is relatively slow. For example, the sputtering rate of titanium dioxide may be only about one-seventh the sputtering rate of silicon dioxide. In an in-line sputtering apparatus as many as three cathodes may be required to deposit the fourth layer of Table 1.

The highest DC reactive sputtering rates for metal oxides are generally achieved for materials in the group consisting of indium oxide, tin oxide, indium tin oxide, and zinc oxide. For example zinc oxide may be DC reactively sputtered about twenty times faster than titanium dioxide, and tin oxide may be sputtered about ten times faster than titanium dioxide. These materials have a refractive index lower than 2.0 at a wavelength of about 520 nanometers. For example zinc oxide has a refractive index of about 1.8 and tin oxide has a refractive index of about 1.94, i.e., zinc oxide and tin oxide have a refractive index lower than the value taught by Rock and Sulzbach as the preferred refractive index for layer 30 in structure 20. It has been determined, however, that in certain circumstances, for example, when second layer 26 has a refractive index greater than about 2.2 at a wavelength of about 520 nanometers, layer 30 may have a refractive index less than 2.0 and layer thicknesses for structure 20 may be optimized to produce equivalent optical performance, or even superior optical performance, compared with a similar structure wherein layer 30 has a refractive index higher than 2.0 at a wavelength of about 520 nanometers.

Figure 3:
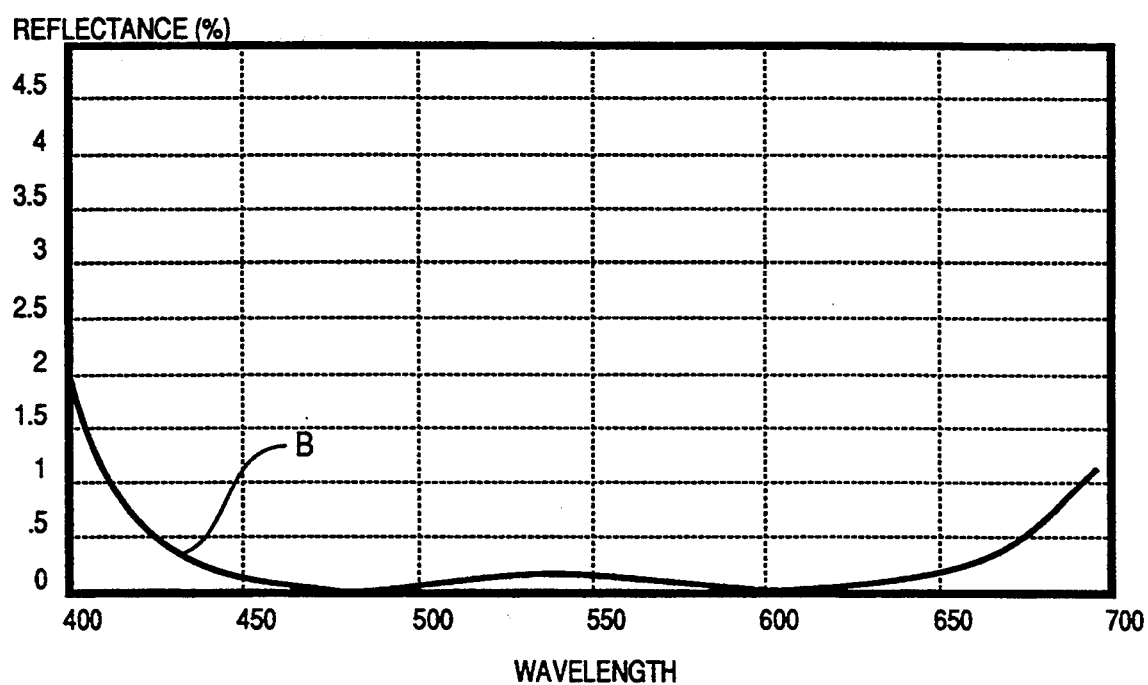
FIG. 3 graphically illustrates the reflection as a function of wavelength for one surface of a substrate coated with a four-layer antireflection according to an embodiment of the present invention wherein the second layer is a layer of titanium dioxide and the fourth layer is a layer of tin oxide ($SnO_2$).

Referring now to FIG. 3, the computed reflection as a function of wavelength (curve B) is shown for a coating 20 wherein first and third layers 24 and 28 are silicon dioxide layers, second layer 26 is a titanium dioxide layer, and fourth layer 30 is a tin oxide layer. The thickness of the layers is listed in Table 2. The layer thicknesses were computer optimized to provide the lowest possible reflection in the wavelength range between about 425 and 675 nanometers. The coating has a photopic reflection of about 0.14 percent, i.e about forty percent less than the coating of Table 1.

TABLE 2

| Layer | Physical | | Optical |
|---|---|---|---|
| | Material | Thickness (nm) | Thickness @ λ = 500 nm |
| 1 | $SiO_2$ | 86.5 | .253 |
| 2 | $TiO_2$ | 106.9 | .502 |
| 3 | $SiO_2$ | 21.2 | .062 |
| 4 | SnO | 27.2 | .105 |

The coating of Table 2 contains one less layer of titanium dioxide than the coating of Table 1. The additional layer of titanium dioxide takes more than about three times longer to deposit than a layer of silicon dioxide using the same number of cathodes for each layer, or more than three times as many cathodes to deposit it at the same rate. Materials having a refractive index less than about 2.0 may not be effectively substituted for titanium dioxide in layer 26.

Niobium oxide has about the same refractive index as titanium dioxide at a wavelength of about 520 nanometers. Niobium oxide, however, may be sputtered at a rate five to six times faster than titanium dioxide. Additionally, niobium oxide has lower dispersion than titanium dioxide. As such, an antireflection coating including niobium oxide may be effective over a wider range of wavelengths, than an antireflection coating including titanium dioxide. Optical properties of DC reactive sputtered niobium oxide, and a process for DC reactive sputtering niobium oxide, are discussed in detail in co-pending U.S. patent application Ser. No. 07/575,345, assigned to the same assignee as the present invention, the complete disclosure of which is hereby incorporated by reference.

Figure 4:
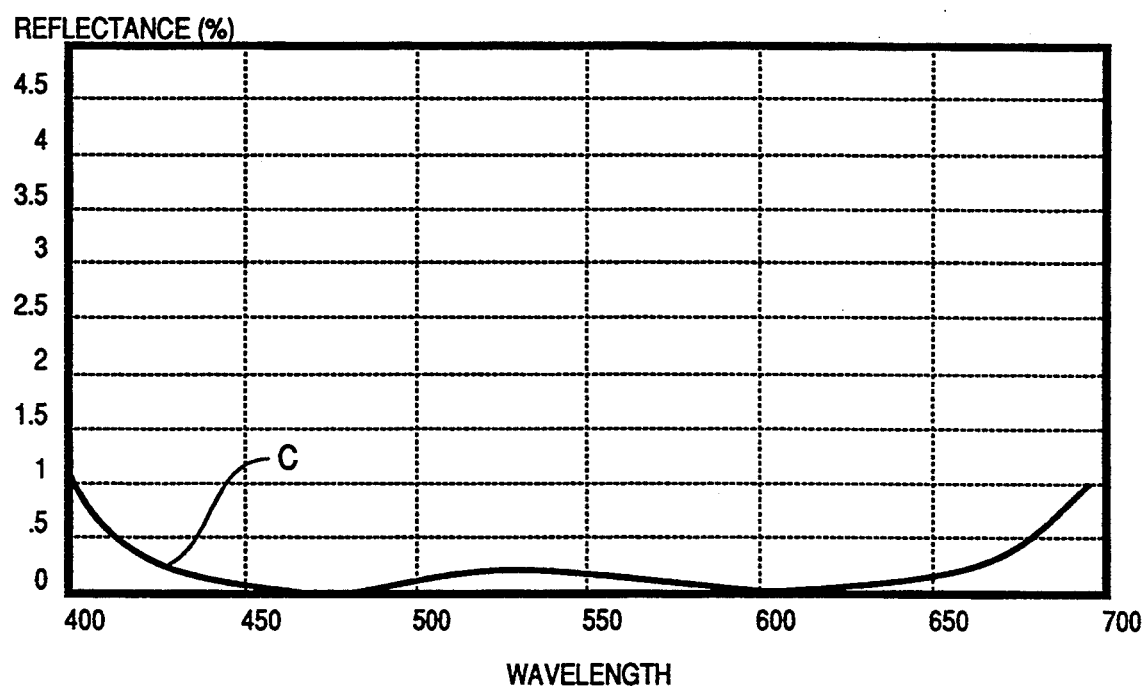
FIG. 4 graphically illustrates the reflection as a function of wavelength for one surface of a substrate coated with a four-layer antireflection coating according to an embodiment of the present invention wherein the second layer is a layer of niobium oxide ($Nb_2O_5$) and the fourth layer is a layer of tin oxide.

Referring now to FIG. 4, the computed reflection as a function of wavelength (curve C) is shown for a coating 20 wherein first and third layers 24 and 28 are silicon dioxide layers, layer 26 is a niobium oxide layer, and layer 30 is a tin oxide layer. The thickness of the layers is shown in Table 3. The layer thicknesses were computer optimized to provide the lowest possible reflection in the wavelength range between about 425 and 675 nanometers. The coating has a photopic reflection of about 0.14 percent. This is about the same photopic reflection as the coating of Table 1, however, the coating of Table 3 may be produced in an in-line sputtering apparatus about three times faster than the coating of Table 1.

TABLE 3

| Layer | Physical | | Optical |
|---|---|---|---|
| | Material | Thickness (nm) | Thickness @ λ = 500 nm |
| 1 | $SiO_2$ | 87.0 | .254 |
| 2 | $Nb_2O_5$ | 110.0 | .517 |
| 3 | $SiO_2$ | 23.9 | .070 |
| 4 | $SnO_2$ | 26.5 | .103 |

TABLE 4

| Layer No. | TAble 1 Coating Line Speed 47 in/min | | Table 3 Coating Line Speed 80 in/min | |
|---|---|---|---|---|
| | Material | Cathodes | Material | Cathodes |
| 1 | $SiO_2$ | 4 | $SiO_2$ | 6 |
| 2 | $TiO_2$ | 9 | $Nb_2O_5$ | 6 |
| 3 | $SiO_2$ | 1 | $SiO_2$ | 2 |
| 4 | $TiO_2$ | 2 | $SnO_2$ | 1 |

Referring to Table 4, arrangements of cathodes for depositing the coating of Table 1 and the coating of Table 3 in an in-line sputtering apparatus having a total of 15 cathodes is shown. The deposition speed is stated in terms of a line speed in inches per minute (in/min). The line speed is the speed at which substrates are transported past the cathodes to receive sputtered material. In the coating of Table 1 the material with the slowest sputtering rate is titanium dioxide. In Table 3 the material with the slowest sputtering rate is silicon dioxide. Comparing the arrangement of cathodes for the coating of Table 1 with the arrangement for the coating of Table 3 it will be seen that cathodes no longer required for the slow sputtering titanium dioxide are used to deposit silicon dioxide.

In summary, a four-layer antireflection coating structure for deposition by DC reactive sputtering in an in-line sputtering apparatus has been described. Materials of the structure are selected to provide a high deposition rate for the coating without significantly compromising optical performance. The coating differs from prior art four-layer antireflection coatings in that the fourth layer of the coating, located adjacent the substrate, has a refractive index less than 2.0.

The present invention has been described in terms of a preferred embodiment and an alternate embodiment. The invention, however, is not limited to the embodiments described and depicted. Rather, the scope of the invention is defined by the appended claims.

What is claimed is:

1. A coating on a substrate for reduction of reflection at a given wavelength, comprising:

four layers designated the first, second, third, and fourth in consecutive numerical order beginning with the layer farthest from the substrate;

said first layer having a refractive index less than the refractive index of the substrate and an optical thickness of about one-quarter of said wavelength;

said second layer having a refractive index greater than 2.2 and having an optical thickness of about one-half of said wavelength;

said third layer having a refractive index less than said second layer;

said fourth layer having a refractive index greater than the refractive index of said third layer but less than about 2.0; and said third and fourth layers having a combined optical thickness less than about one quarter of said wavelength.

2. The coating of claim 1 wherein said wavelength is between about 480 and 560 nanometers.

3. The antireflection coating of claim 1 wherein said second layer includes titanium dioxide.

4. The antireflection coating of claim 3 wherein said first and third layers include silicon dioxide.

5. The antireflection coating of claim 4 wherein said fourth layer includes a material selected from the group consisting of indium oxide, tin oxide, indium tin oxide, and zinc oxide.

6. The antireflection coating of claim 1 wherein said second layer includes niobium oxide.

7. The antireflection coating of claim 6 wherein said first and third layers include silicon dioxide.

8. The antireflection coating of claim 7 wherein said fourth layer includes a material selected from the group consisting of indium oxide, tin oxide, indium tin oxide, and zinc oxide.

9. A coating on a substrate for reduction of reflection at a given wavelength, comprising:

four layers designated the first, second, third, and fourth in consecutive numerical order beginning with the layer farthest from the substrate;

said first layer having a refractive index less than the refractive index of the substrate and an optical thickness of about one-quarter of said wavelength;

said second layer including niobium oxide and having a refractive index greater than 2.2 and having an optical thickness of about one-half of said wavelength;

said third layer having a refractive index less than said second layer;

said fourth layer having a refractive index greater than the refractive index of said third layer but less than 2.0; and said third and fourth layers having a combined optical thickness less than about one quarter of said wavelength.

* * * * *

UNITED STATES PATENT AND TRADEMARK OFFICE
CERTIFICATE OF CORRECTION

PATENT NO. : 5,450,238
DATED : September 12, 1995
INVENTOR(S) : Erik J. Bjornard, et al It is certified that error appears in the above-indentified patent and that said Letters Patent is hereby corrected as shown below:

On the title page:Item [54] and Column 1, line 3, change IN-LIKE DC" to read --IN-LINE DC --.

Signed and Sealed this

First Day of April, 1997

Attest:

BRUCE LEHMAN

Attesting Officer

Commissioner of Patents and Trademarks